United States Patent Office 3,167,653
Patented Jan. 26, 1965

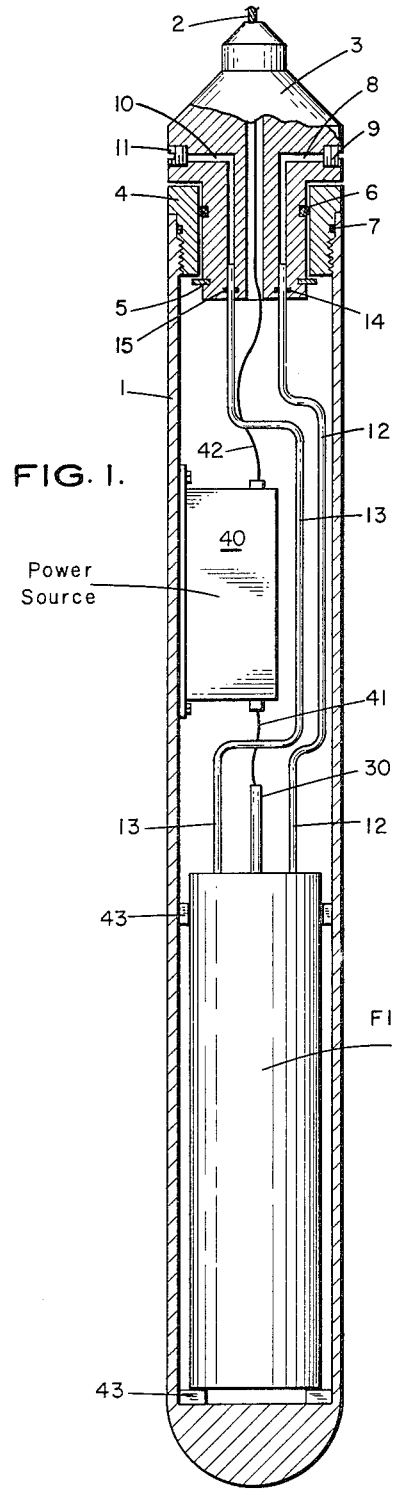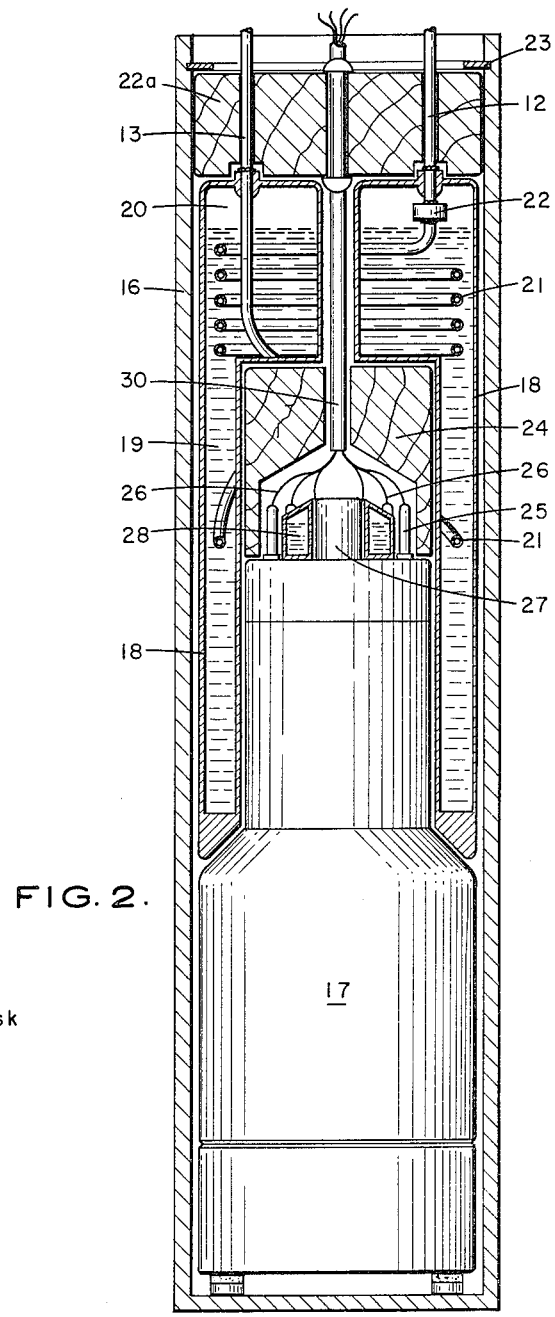

3,167,653
COOLING RADIATION DETECTORS IN WELL
LOGGING APPARATUS
Robert C. Rumble and Wilmer A. Hoyer, Houston, Tex., assignors, by mesne assignments, to Jersey Production Research Company, Tulsa, Okla., a corporation of Delaware
Filed Nov. 29, 1962, Ser. No. 240,906
3 Claims. (Cl. 250—71.5)

The present invention concerns method and apparatus for maintaining radiation detectors at low, constant temperatures.

The necessity for protecting radiation detectors from elevated and constantly changing temperatures such as those encountered in making a well survey is well recognized. Temperatures experienced by a logging sonde in a well bore are frequently sufficiently high to cause permanent damage to an unprotected detector. Also, in general, within the operable range of a scintillation type detector, changes of temperature have an adverse effect upon overall gain.

A constant temperature must be maintained for the scintillation detector when it is used to obtain accurate information as to the amplitudes of scintillation pulses representative of energy levels of the radioactive particles or photons impinging on the scintillation material of the detector.

In some detector systems where temperature stability is not maintained, elaborate means are needed to monitor the detector gain almost continuously during the logging operation so that appropriate corrections may be applied to the observed data; but even then, in such systems, it is difficult to compensate for the deterioration in the signal-to-noise ratio at higher temperatures.

The detector unit may be held at constant, low temperatures by positioning it in a refrigerated, thermally insulated container and the present invention is of this general type. An important advantage of the present invention not found in known devices of this type resides in the ability to refrigerate the detector unit without dismantling the logging sonde of which it is a part. In addition, the apparatus is rugged, compact and readily applicable for field use.

A primary object, therefore, of the present invention is to provide improved method and means for maintaining down-the-hole temperature stability for a radiation detector unit used in logging sondes.

Briefly, the cooling system of the invention comprises a thermally insulated enclosure containing a detector unit, a reservoir of a cooling medium, and a refrigeration system including means for circulating a refrigerant through the cooling medium. Insulation means and a heat sink are preferably interposed between at least a portion of the detector unit and the cooling medium to prevent undue cooling of the detector unit. Preferably the cooling medium is water. The refrigerant is circulated through the water reservoir until a part, but not all of it, is frozen to avoid excessively chilling the detector unit.

The above object and other objects and advantages of the invention will be apparent from a more detailed description thereof when taken with the drawings wherein:

FIG. 1 is a vertical, partly sectional view of the apparatus of the invention suspended on a wire line; and FIG. 2 is a vertical, partly sectional view of a portion of the apparatus of FIG. 1.

Reference is now made to the drawings in greater detail. In FIG. 1 there is shown a logging case 1 supported by a conductor cable 2 by means of a swivel tail plug which includes a swivel member 3 and a stationary ring member 4 held in engagement by Tru-arc 5. Swivel member 3 turns in member 4 which threadedly engages logging case 1. O-ring seals 6 and 7 provide fluid seals between members 3 and 4 and between member 4 and logging case 1, respectively. The tail plug is easily removed by unscrewing member 4 while preventing rotation of logging case 1 and swivel member 3. A refrigerant inlet passageway 8 which is provided with, on the outer surface of member 3, a sealing cap 9, and a refrigerant outlet passageway 10 which is provided with a sealing cap 11 on the outer surface of member 3 are formed in swivel member 3. Passageways 8 and 10 connect to refrigerant conduits 12 and 13, respectively, within case 1. O-ring seals 14 and 15, seal the connections between the passageways and conduits within swivel member 3. A source of electrical power designated 40 for operating the detector unit is positioned within case 1 and electrically coupled to the detector unit and cable 2 by means of conductors 41 and 42, respectively. The lower ends of refrigerant conduits 12 and 13 connect to components inside a Dewar flask 16, the details of which are shown in FIG. 2. Flask 16 is held in place by supports 43 as shown.

As seen in FIG. 2, an integrated crystal-photomultiplier detector unit 17 sealed within an aluminum shell is arranged in Dewar flask 16. A closed brass case 18 forms a solids or ice-making chamber which surrounds the neck portion of the base of detector unit 17 and a cooling medium such as water 19 partially fills the hollow interior 20 of case 18. A copper tubing coil 21 connected at its ends to refrigerant conduits 12 and 13 is also located within case 18. An expansion orifice 22 is located in coil 21 adjacent its connection to refrigerant intake conduit 12.

A balsa wood, polyurethane foam or other good type structural insulating form 22a is mounted between the upper end of case 18 and a retaining ring 23 fitted on the interior wall of flask 16. An insulating form 24 composed of insulating material similar to that of form 22a is positioned adjacent the upper end of detector unit 17 between it and case 18 and engages the base of the detector unit in a circular band of contact around the photomultiplier tube base prongs 25. Electrical leads 26 attached to these prongs for carrying operating voltage to the photomultiplier tube and photomultiplier signals from it are sheathed in a low thermal conductor 30 which extends to the exterior of flask 16. A hollow annular brass heat sink 28 partially filled with water is positioned in the annular space between base prongs 25 and the base protuberance 27 of the photomultiplier tube.

To cool the contents of Dewar flask 16 at the well site prior to conducting logging operations, the logging sonde is maintained in either a vertical or horizontal position and an appropriate refrigerant is passed through Dewar flask 16. First, caps 9 and 11 are removed; refrigerant lines, not shown, are connected in their places and a refrigerant is circulated through passageway 8, conduit 12, orifice 22, coil 21, conduit 13, and passageway 10 until some, but not all, of water 19 has been solidified. When cooling is completed, the refrigerant lines are disconnected and caps 9 and 11 are replaced.

In practice, liquid carbon dioxide from a commercial cylinder is introduced into the ice-making unit 18 at cylinder pressure. The liquid expands through orifice 22 and is converted in part to Dry Ice and gaseous carbon dioxide at temperatures below $-35°$ C. Ice readily forms on the exterior of cooling coil 21 below the water level. As mentioned previously, the cooling process is terminated before all of the water is frozen. The cooling coil is intentionally concentrated in the upper part of the freezing unit so that a sizeable volume of water at the bottom of the chamber is not in close proximity to the coil and will remain unfrozen.

The insulating form 24 and heat sink 28 near the base of the photomultiplier component of the detector unit function to prevent the temperature in this area from dropping to a temperature below 0° C. during the freezing operation which would occur even though the water at the bottom of the freezing unit remains unfrozen and even though the temperature of the system soon rises to the freezing point because of the water remaining unfrozen. Exposure of the photomultiplier base to extremely low temperatures for even short intervals causes a substantial gain drift. By eliminating the conventional photomultiplier socket in favor of wires soldered directly to the tube prongs and installing insulating form 24 and heat sink 28, detector gain drift is consistently reduced during cooling and for several hours thereafter. In place of heat sink 28, a small heating device such as an electrically heated filament may be used to prevent undue cooling of the photomultiplier tube base during the ice-making operation.

Having fully described the nature, objects, and operation of our invention, we claim:

1. Apparatus for use in maintaining temperature stability of a detector unit used in well logging operations comprising:
   an insulated enclosure;
   a detector unit arranged in said enclosure;
   a reservoir of cooling medium positioned adjacent said detector unit;
   refrigeration means arranged in said reservoir for circulating a refrigerant through said cooling medium to freeze only a part of said cooling medium;
   insulation means arranged between said reservoir of cooling medium and said detector unit; and
   heat sink means arranged between said insulation means and said detector unit;
   both said insulation means and heat sink means being adapted to prevent the temperature of said detector unit from dropping below a predetermined level.

2. Apparatus for use in maintaining temperature stability of a detector unit used in well logging operations comprising:
   an insulated enclosure;
   a detector unit arranged in said enclosure;
   a reservoir of cooling medium positioned adjacent said detector unit;
   refrigeration means arranged in said reservoir for circulating a refrigerant through said cooling medium to freeze only a part of said cooling medium;
   insulation means closing one end of said enclosure; and
   means including additional insulation means arranged between said reservoir of cooling medium and said detector unit adapted to prevent the temperature of said detector unit from dropping below a predetermined level.

3. Apparatus for use in maintaining temperature stability of a detector unit used in well logging operations comprising:
   a logging casing adapted to be suspended on a wire line in a well bore and including a plug comprising a stationary ring member screw threaded to one end of said casing and a rotatable member being provided with inlet and outlet refrigerant passageways extending from the exterior of said rotatable member to within said casing;
   removable caps adapted to sealingly close off said passageways;
   an enclosure arranged within said casing;
   two conduits arranged in said casing, one extending from one of said passageways and the other extending from the other of said passageways;
   sealing means closing off the space between said conduits and said passageways and the space between said rotatable member and said stationary member;
   a photomultiplier detector unit arranged in said enclosure;
   a reservoir of cooling medium arranged in said enclosure;
   a refrigerant circulating coil arranged in said cooling medium reservoir and connected at one end to one of said conduits and the other end thereof to said other conduit to form a continuous passageway;
   an expansion orifice arranged adjacent one of said conduits;
   first insulation means closing off one end of said enclosure;
   second insulation means arranged between said reservoir of cooling medium and said detector unit;
   a hollow annular heat sink arranged between said second insulation means and said detector unit; and
   means extending through said enclosure for carrying electrcial leads to said photomultiplier tube.

References Cited in the file of this patent

UNITED STATES PATENTS

| | | |
|---|---|---|
| 2,433,554 | Herzog | Dec. 30, 1947 |
| 2,824,233 | Herzog | Feb. 18, 1958 |
| 3,038,074 | Scherbatskoy | June 5, 1962 |